(12) United States Patent
Sobel et al.

(10) Patent No.: US 10,632,621 B2
(45) Date of Patent: Apr. 28, 2020

(54) ROBOTIC GROMMET INSTALLERS AND METHODS OF INSTALLING GROMMETS

(71) Applicant: Toyota Research Institute, Inc., Los Altos, CA (US)

(72) Inventors: Erik C. Sobel, Newton, MA (US); Calder Phillips-Grafflin, Jamaica Plain, MA (US); Aimee Goncalves, Kingston, MA (US); Guy Danner, Somerville, MA (US); Ira Spool, Brookline, MA (US); Jonathan Kalow, Cambridge, MA (US); Nicholas Brennan, Somerville, MA (US); Seth Newburg, Arlington, MA (US); Joseph Fenton, Uxbridge, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 36 days.

(21) Appl. No.: 16/157,500

(22) Filed: Oct. 11, 2018

(65) Prior Publication Data
US 2019/0321982 A1 Oct. 24, 2019

Related U.S. Application Data

(60) Provisional application No. 62/659,397, filed on Apr. 18, 2018.

(51) Int. Cl.
*B25J 9/16* (2006.01)
*B23P 19/08* (2006.01)
(Continued)

(52) U.S. Cl.
CPC ........... *B25J 9/1687* (2013.01); *B23P 19/006* (2013.01); *B23P 19/084* (2013.01); *B23Q 7/10* (2013.01);
(Continued)

(58) Field of Classification Search
CPC .. B25J 9/1687; B25J 15/0616; B25J 15/0683; B25J 15/0019; B25J 9/10; B25J 15/0408;
(Continued)

(56) References Cited

U.S. PATENT DOCUMENTS

| 7,094,299 B2 | 8/2006 | Ondrus et al. |
| 8,850,696 B2 | 10/2014 | Baudisch et al. |

(Continued)

FOREIGN PATENT DOCUMENTS

| DE | 102014004045 A1 | 9/2015 |
| DE | 102015008590 A1 | 1/2017 |

(Continued)

OTHER PUBLICATIONS

Masser; Robots and humans team up at BMW to digitally disrupt auto industry; Digitalist Magazine; May 2016; 7 pages.

*Primary Examiner* — Jermie E Cozart
(74) *Attorney, Agent, or Firm* — Dinsmore & Shohl LLP

(57) ABSTRACT

A robotic grommet installer includes a robotic arm and an installation unit. The installation unit includes a rotary grommet holder rotatively coupled to the robotic arm and an installer coupled to the robotic arm. The rotary grommet holder includes a plurality of grommet chambers spaced circumferentially about a rotational axis of the rotary grommet holder. Each grommet chamber of the plurality of grommet chambers is configured to hold a plurality of grommets. The installer is configured to retrieve a grommet from the rotary grommet holder, wherein the rotary grommet holder is configured to rotate to align the installer with an available grommet positioned within one of the plurality of grommet chambers.

20 Claims, 13 Drawing Sheets

(51) Int. Cl.
*B25J 15/06* (2006.01)
*B25B 27/28* (2006.01)
*B25J 9/10* (2006.01)
*B25J 15/04* (2006.01)
*B23P 19/00* (2006.01)
*B23Q 7/10* (2006.01)
*B25J 19/06* (2006.01)
*B25J 15/00* (2006.01)
*B25J 18/04* (2006.01)

(52) U.S. Cl.
CPC ............... *B25B 27/28* (2013.01); *B25J 9/10* (2013.01); *B25J 15/0408* (2013.01); *B25J 15/0441* (2013.01); *B25J 15/0616* (2013.01); *B23P 19/007* (2013.01); *B25J 15/0019* (2013.01); *B25J 15/0683* (2013.01); *B25J 18/04* (2013.01); *B25J 19/06* (2013.01); *Y10T 29/53478* (2015.01)

(58) Field of Classification Search
CPC ...... B25J 15/0441; B25J 18/04; B23P 19/084; B23P 19/007; B23P 19/006; B25B 27/28; B23Q 7/10
See application file for complete search history.

(56) References Cited

U.S. PATENT DOCUMENTS

| | | | |
|---|---|---|---|
| 9,617,692 | B2 | 4/2017 | Brenny et al. |
| 9,656,391 | B2 | 5/2017 | Kossmann et al. |
| 2011/0182708 | A1* | 7/2011 | Baudisch ............... B23P 19/02 414/737 |
| 2011/0209320 | A1* | 9/2011 | Connolly ............. B23P 19/084 29/407.04 |
| 2017/0151677 | A1 | 6/2017 | Mayr et al. |

FOREIGN PATENT DOCUMENTS

| | | |
|---|---|---|
| JP | 2586884 B2 | 3/1997 |
| JP | H11300542 A | 1/1999 |
| WO | 2016173756 A1 | 11/2016 |
| WO | 2016173757 A1 | 11/2016 |

* cited by examiner

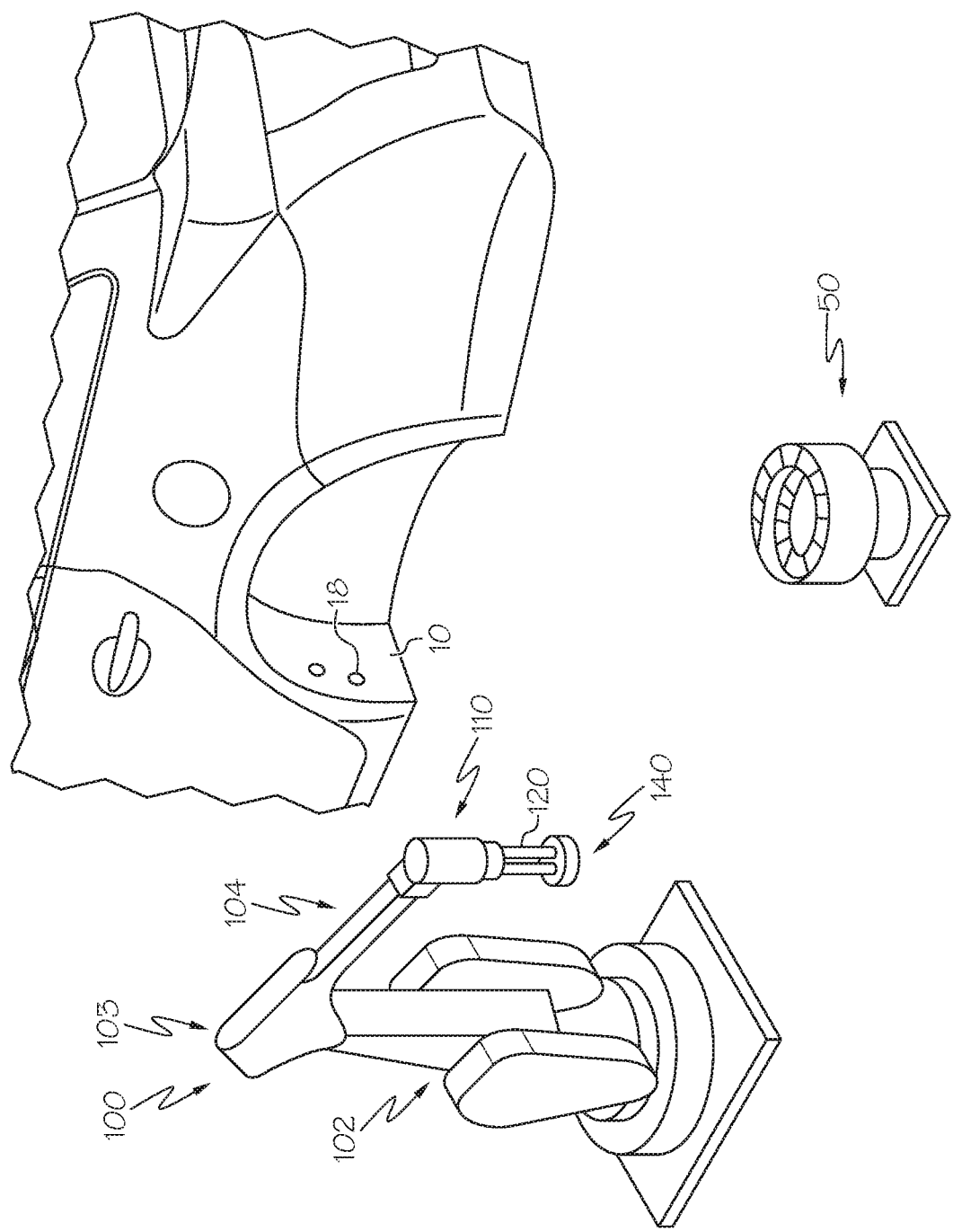

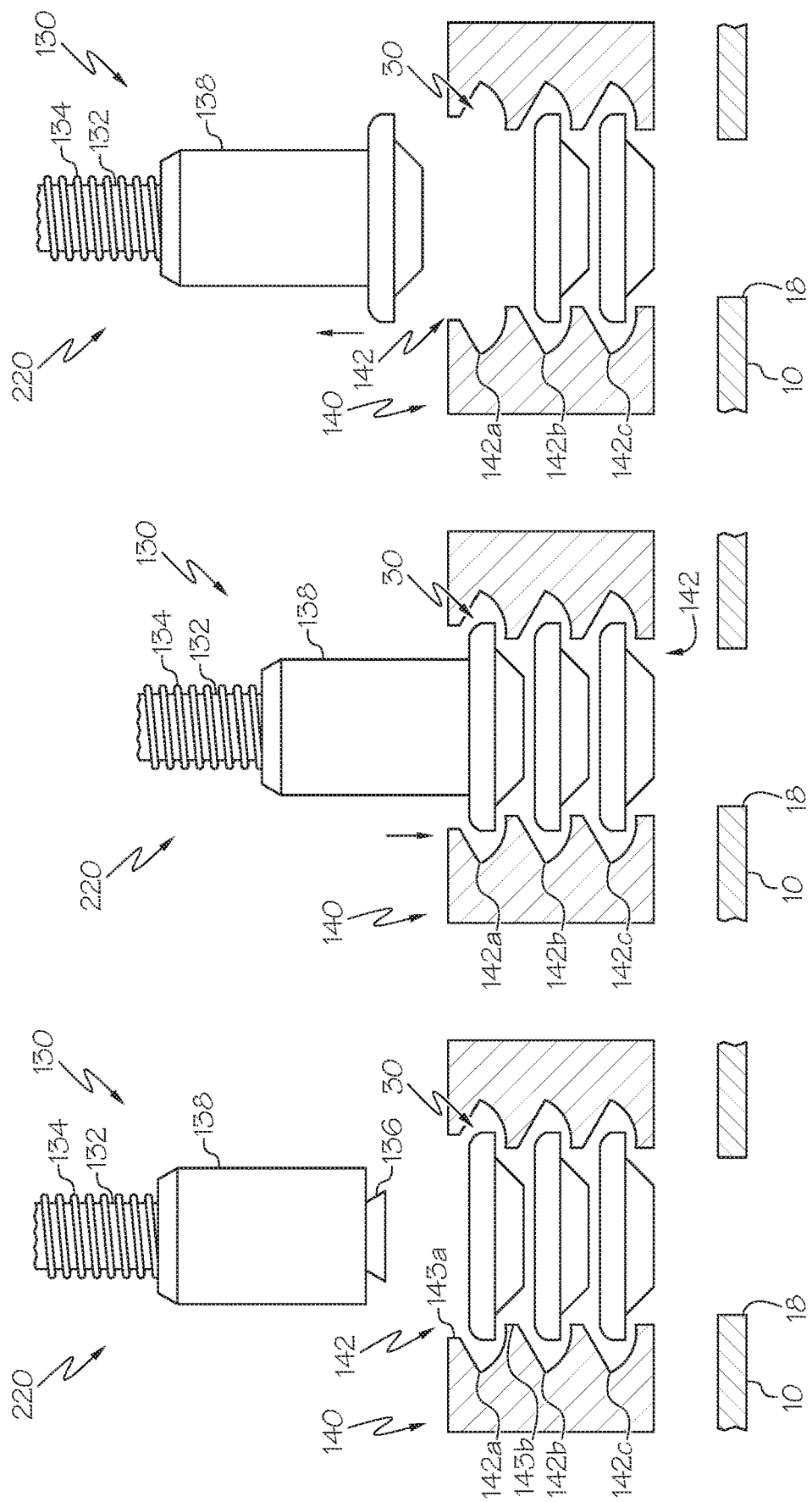

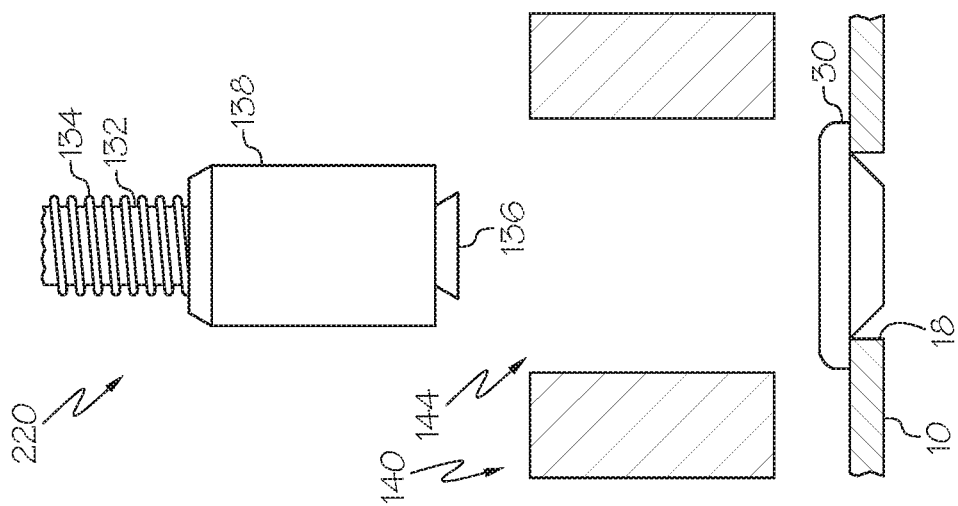
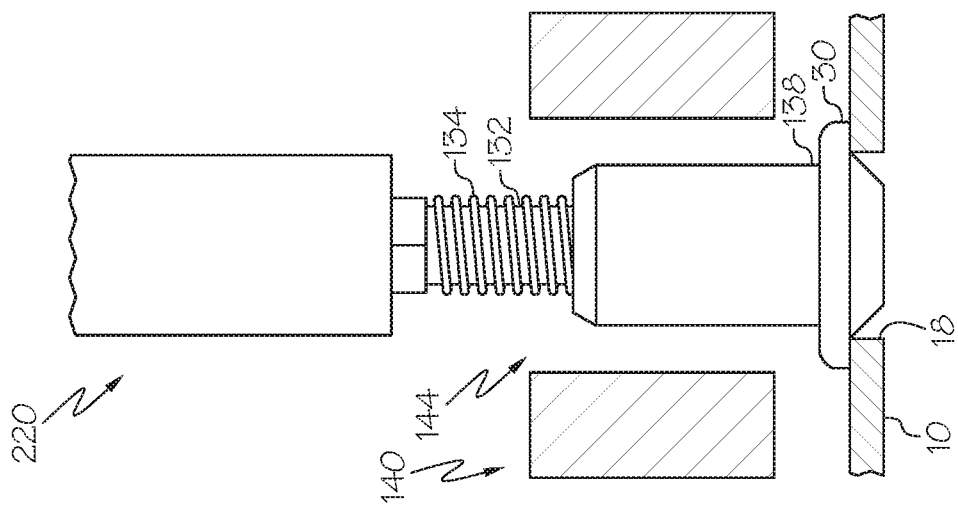
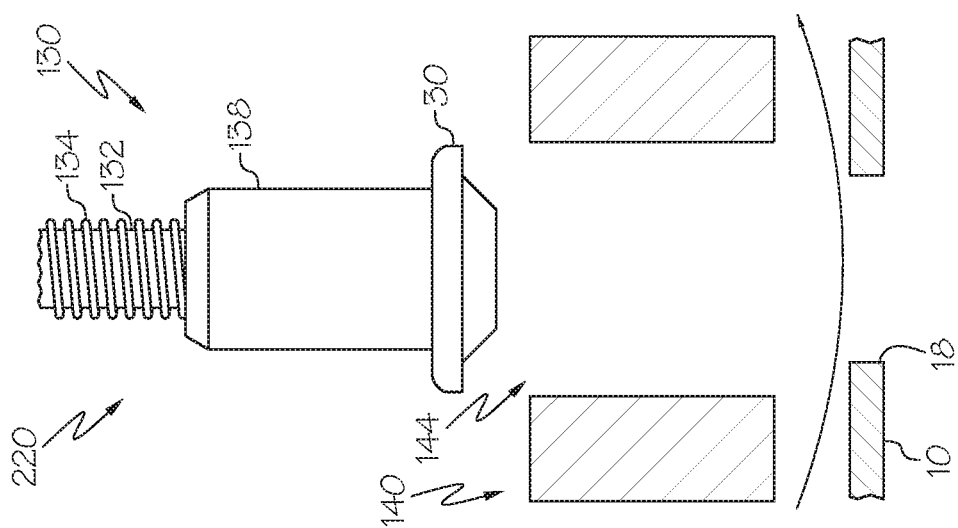

ROBOTIC GROMMET INSTALLERS AND METHODS OF INSTALLING GROMMETS

CROSS-REFERENCE TO RELATED APPLICATIONS

This application claims the benefit of U.S. Provisional Application Ser. No. 62/659,397, filed Apr. 18, 2018, and entitled "Robot End Effector and Grommet Dispenser" the entirety of which is incorporated by reference herein.

TECHNICAL FIELD

The present specification generally relates to the installation of grommets and, more specifically, robotic grommet installers and methods of installing grommets within vehicle bodies.

BACKGROUND

The chassis of a vehicle often has a plurality of holes that need to be plugged during fabrication of the vehicle. The holes may be provided for reasons such as allowing paint to drip through during painting of the vehicle, or allowing a space for cabling to pass through the vehicle. Unused holes are often filled using a plug (e.g., a grommet). Presently, the plugs are inserted into the holes of the chassis manually by team members. The plugs are provided in a bin that the team member grabs, and then are inserted into the holes of the chassis. The plugging of the holes is a tedious process.

Accordingly, a need exists for robotic grommet installers and alternative methods of installing grommets.

SUMMARY

In one embodiment, a robotic grommet installer includes a robotic arm and an installation unit. The installation unit includes a rotary grommet holder rotatively coupled to the robotic arm, and an installer coupled to the robotic arm. The rotary grommet holder includes a plurality of grommet chambers spaced circumferentially about a rotational axis of the rotary grommet holder. Each grommet chamber of the plurality of grommet chambers is configured to hold a plurality of grommets. The installer is configured to retrieve a grommet from the rotary grommet holder. The rotary grommet holder is configured to rotate to align the installer with an available grommet positioned within one of the plurality of grommet chambers.

In another embodiment, a robotic grommet installer includes a control unit for controlling installation of a grommet using the robotic grommet installer, a robotic arm communicatively coupled to the control unit, and an installation unit. The installation unit includes a rotary grommet holder communicatively coupled to the control unit and an installer communicatively coupled to the control unit. The rotary grommet holder is rotatively coupled to the robotic arm. The rotary grommet holder includes a plurality of grommet chambers spaced circumferentially about a rotational axis of the rotary grommet holder. Each grommet chamber of the plurality of grommet chambers is configured to hold a plurality of grommets. The installer is coupled to the robotic arm and is configured to retrieve the grommet from the rotary grommet holder. The rotary grommet holder is configured to rotate to align the installer with an available grommet positioned within one of the plurality of grommet chambers. The control unit executes logic to cause the robotic grommet installer to rotate the rotary grommet holder to an installer loading position, attach the available grommet positioned within the grommet chamber to the installer, rotate the rotary grommet holder to an installation position, and install the grommet with the installer into a grommet aperture.

In yet another embodiment, a method of installing a grommet into a grommet aperture includes loading a rotary grommet holder with a plurality of grommets, rotating the rotary grommet holder to an installer loading position, attaching the grommet positioned within a grommet chamber of the rotary grommet holder to an installer. The installer is coupled to the robotic arm. The method further includes rotating the rotary grommet holder to an installation position, and installing the grommet with the installer into the grommet aperture. The rotary grommet holder is rotatively coupled to a robotic arm. The rotary grommet holder includes a plurality of grommet chambers spaced circumferentially about a rotational axis of the rotary grommet holder. The plurality of grommets are loaded into a least one of the plurality of grommet chambers.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 generally depicts a robotic grommet installer, according to one or more embodiments shown and described herein;

FIG. 9A schematically illustrates a tip assembly positioned above a rotary grommet holder, according to one or more embodiments shown and described herein;

FIG. 9B illustrates the tip assembly in contact with a grommet, according to one or more embodiments shown and described herein;

FIG. 9C illustrates the tip assembly having removed a grommet from the rotary holder, according to one or more embodiments shown and described herein;

FIG. 9D illustrates the rotary grommet holder rotated to an installation position, according to one or more embodiments shown and described herein;

FIG. 9E illustrate the tip assembly extending through the rotary grommet holder to install the grommet, according to one or more embodiments shown and described herein; and FIG. 9F illustrates the tip assembly retracting back through the robotic grommet installer, according to one or more embodiments shown and described herein.

DETAILED DESCRIPTION

Figure 2A:
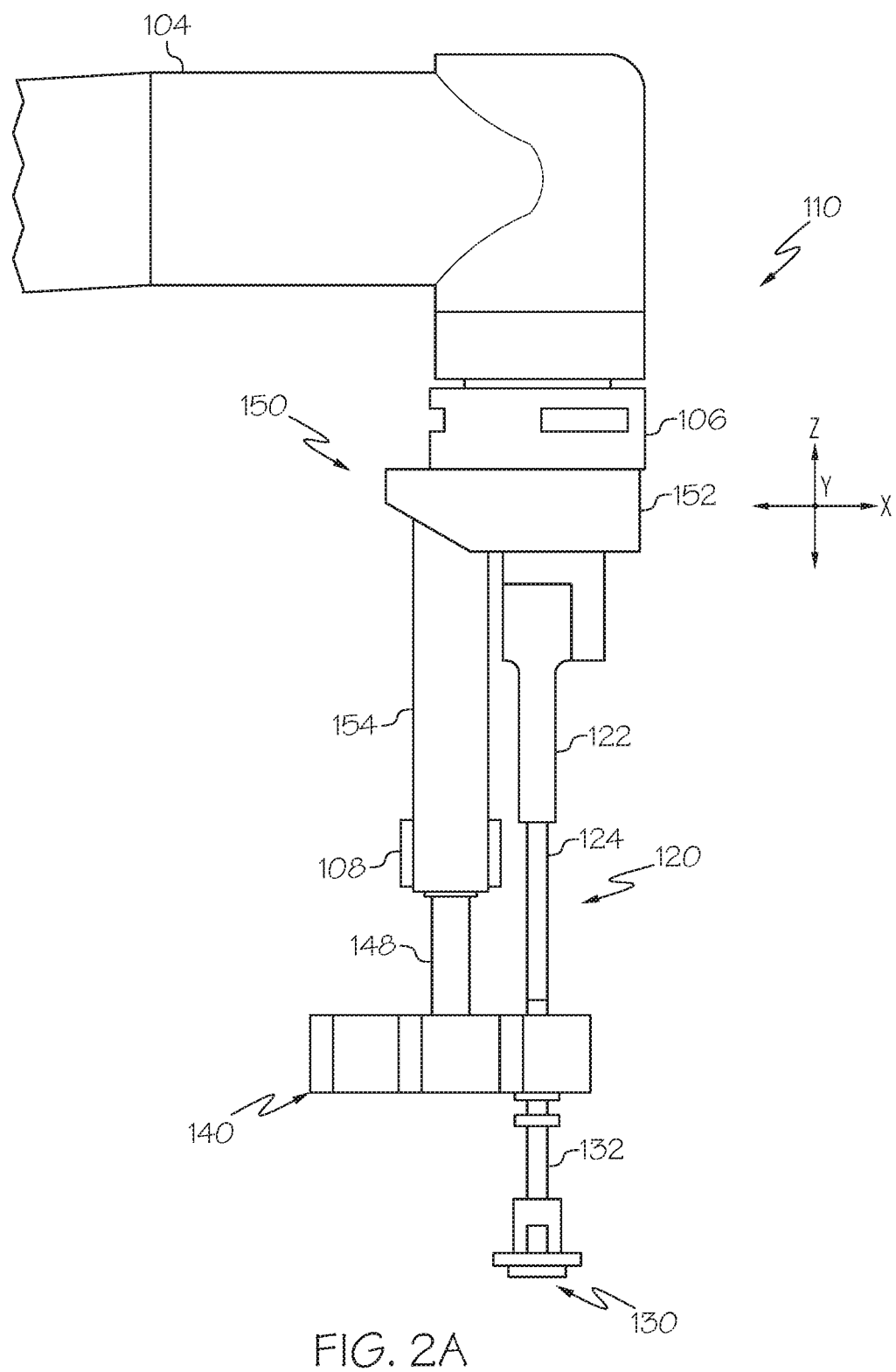
FIG. 2A depicts a detailed side view of an installation unit, according to one or more embodiments shown and described herein.

Embodiments of the present disclosure are directed to robotic grommet installers and methods of installing grommets. Robotic grommet installers of the present disclosure include a robotic arm that is used to insert grommets in locations with tight geometric constraints. Included with the robotic arm are a rotary grommet holder and an installer. The rotary grommet holder has a plurality of grommet chambers spaced circumferentially about a rotational axis. The plurality of grommet chambers each are configured to hold a plurality of grommets. The installer is configured to retrieve a grommet from the rotary grommet holder and then install the grommet into a grommet aperture in, for example, a vehicle panel. In embodiments, the robotic grommet installer is able to insert grommets in locations with tight geometric constraints as only an installer is extended to insert the grommet. Accordingly, the process of installing grommets may be automated, which may improve installation speeds and reduce costs.

Referring now to FIG. 1, a robotic grommet installer 100 is generally depicted adjacent to a vehicle panel 10, and a grommet feeder bowl 50. The robotic grommet installer 100 may include a base 102 and a robotic arm 104 coupled to the base 102. Coupled to the robotic arm 104 is an installation unit 110 that includes a rotary grommet holder 140 and an installer 120. As will be described in greater detail herein, the robotic grommet installer 100 may pre-load the rotary grommet holder 140 with the installer 120 from the grommet feeder bowl 50 allowing continuous operation of the robotic grommet installer 100. The installer 120 may then retrieve a grommet from the rotary grommet holder 140 and install the grommet into a grommet aperture 18 of the vehicle panel 10. It is noted that while the description is generally directed to grommet installation within vehicle panels, it is contemplated that the robotic grommet installer 100 may be useful in the installation of grommets in any field wherein a grommet is installed into a grommet aperture.

The base 102 of the robotic grommet installer 100 may generally provide support to the robotic arm 104. Accordingly, the base 102 may be any structure that supports the robotic arm 104. For example, the base 102 may be a structure that is coupled to the ground and supports the robotic arm 104 at an elevated position. For example, the robotic arm 104 may be positioned at a height to install grommets within the vehicle panel 10 that is moving along an assembly line.

The robotic arm 104 may be pivotally or fixedly coupled to the base 102. For example, the robotic arm 104 may be coupled to the base 102 at a joint 103 that supports multiple degrees of motion (e.g., up-down, side-to-side, rotationally, etc.). In other embodiments, the joint 103 may support fewer or only one degree of motion. The robotic arm 104 may include an actuator (e.g., motorized gearing) that is configured to move the robotic arm 104 to a desired position.

Coupled to the robotic arm 104 is the installation unit 110 that includes the rotary grommet holder 140 and the installer 120. The installation unit 110 may be coupled to the robotic arm 104, for example, at a distal end of the robotic arm 104. In embodiments, it is contemplated that a joint between the installation unit 110 and the robotic arm 104 may support multiple degrees of motion such that the installation unit 110 may, for example, rotate, move up/down, and/or side-to-side, relative to the robotic arm 104. Various embodiments of the installation unit 110 are described in greater detail below.

Figure 2B:
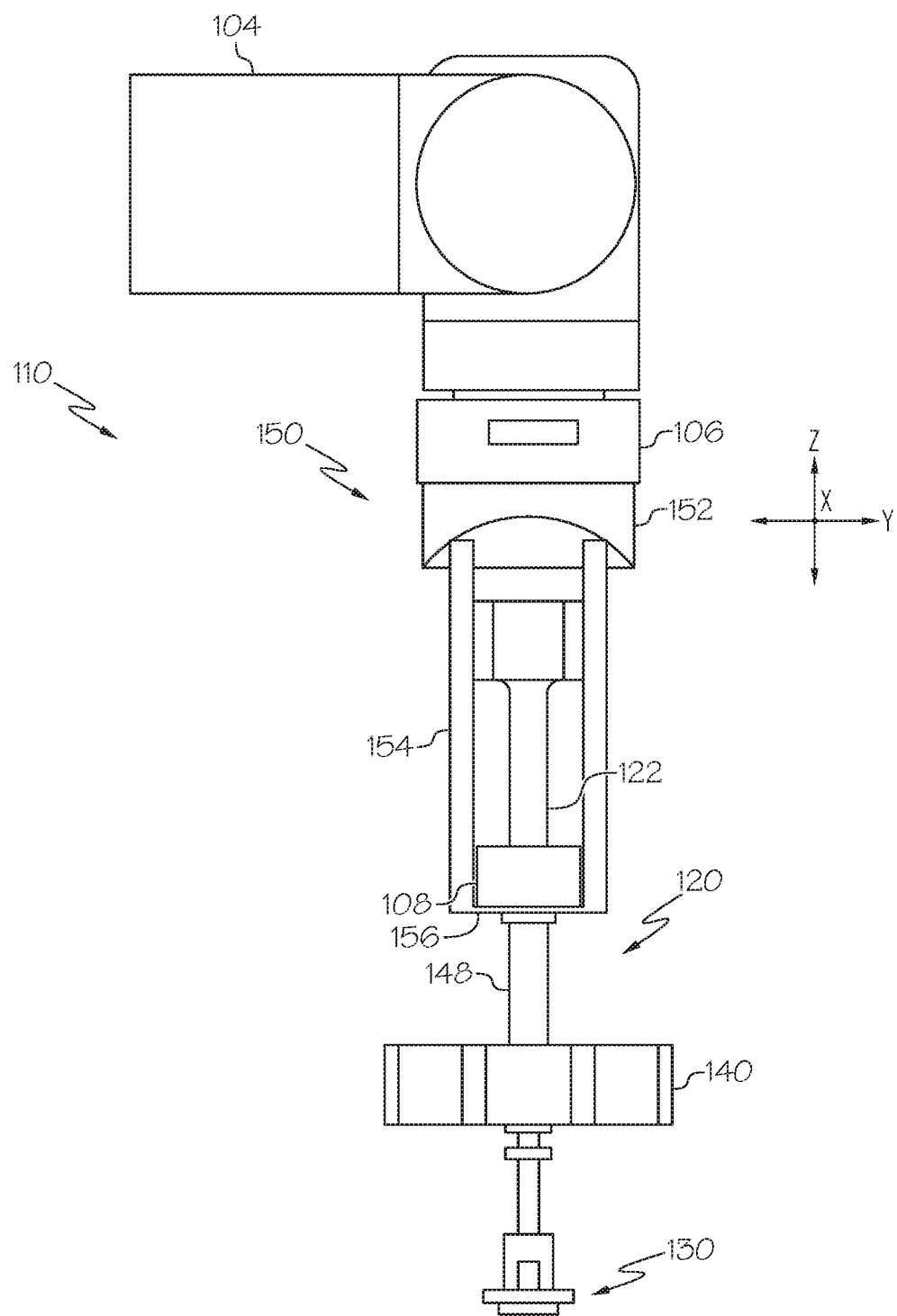
FIG. 2B depicts a detailed front view of the installation unit of FIG. 2A, according to one or more embodiments shown and described herein.

FIGS. 2A and 2B illustrate a side view and a front view, respectively, of the installation unit 110, according to one or more embodiments. The installation unit 110 may include a support fixture 150 that is coupled to the robotic arm 104. In some embodiments, a force and/or torque sensor 106 may be coupled between the support fixture 150 and the robotic arm 104 to provide a force/torque signal indicative a force being applied by the installer 120. For example, the force/torque signal may indicate the force applied by the installer 120 to load and/or remove a grommet from the rotary grommet holder 140. The force/torque signal may also indicate the amount of force used to install a grommet with a grommet aperture 18 of a vehicle panel 10. A reading of the torque/force sensor 106 may also provide indications wherein the robotic grommet installer 100 fails to insert a grommet (e.g., not enough force applied, etc.). In some embodiments, the torque/force sensor 106 may be located elsewhere. For example, the force/torque sensor 106 may be positioned within a tip assembly 130 of the installer 120, as will be described in greater detail below. The force/torque sensor 106 may be a multi-axis sensor or a single axis sensor. In some embodiments, that amount of force applied by the installer 120 may be controlled via a control unit based on operator specifications.

The support fixture 150 may generally provide structure on to which the various components of the installation unit 110 may be mounted. For example, the support fixture 150 may include a laterally extending installer connector portion 152 and a vertically extending grommet holder connector portion 154. The term "vertical" generally refers to the Z-axis of the depicted coordinate axes. The term "lateral" generally refers to direction transverse to the Z-axis of the depicted coordinate axes (e.g., the X and/or Y axis). The installer connector portion 152 and grommet holder connector portion 154 may be integrally formed with one another or otherwise coupled to one another through any conventional manufacturing techniques (e.g., welding, brazing, fastening, etc.).

Referring now to the rotary grommet holder 140, the rotary grommet holder 140 is rotatively coupled to the robotic arm 104. For example, the rotary grommet holder 140 may be rotatively coupled to the robotic arm 104 through the grommet holder connector portion 154 of the support fixture 150. In some embodiments, the rotary grommet holder 140 is also removably coupled to the robotic arm 104 to facilitate replacement of the rotary grommet holder 140. For example, a plurality of pre-loaded rotary grommet holders may be available such that an empty rotary grommet holder may be replaced with a full rotary grommet holder.

The rotary grommet holder 140 is configured to hold a plurality of grommets therein. To facilitate rotation of the rotary grommet holder 140, the rotary grommet holder 140 may rotatively coupled to the robotic arm 104 through a rotary actuator 108 (e.g., rotational motor with or without an integrated controller). As illustrated in FIGS. 2A and 2B, the rotary actuator 108 may be supported by the grommet holder connector portion 154 of the support fixture 150. For example, the grommet holder connector portion 154 may form a platform 156 upon which the rotary actuator 108 may sit. A stem 148 may extend from a center of the rotary grommet holder 140 to define a rotational axis. The stem 148 may be operatively coupled to the rotary actuator 108 (e.g., through a gear box), wherein the rotary actuator 108 causes the stem 148 and the rotary grommet holder 140 to rotate. As will be described in more detail below, the rotary grommet holder 140 may be rotated to predetermined positions for supply and installation of a grommet.

Figure 3A:
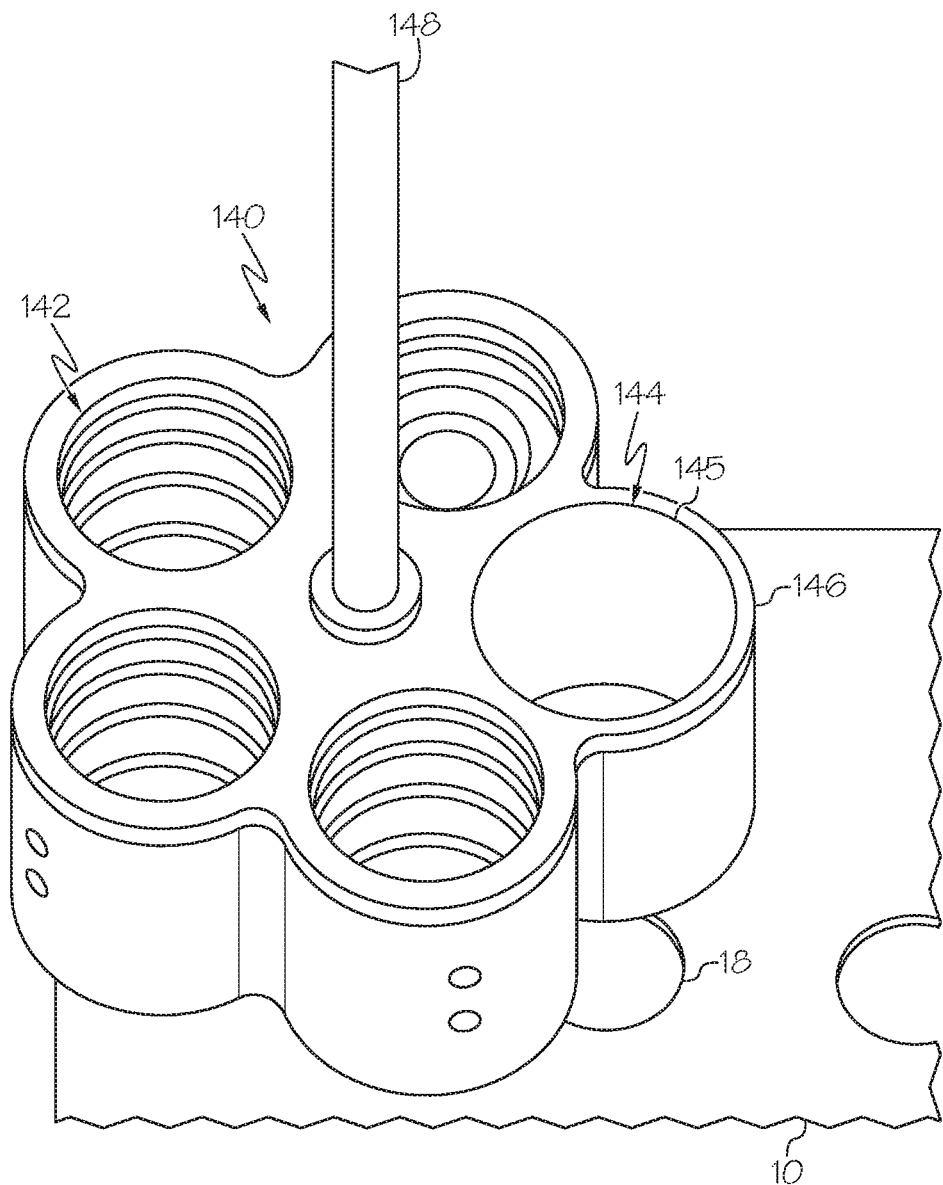
FIG. 3A depicts a rotary grommet holder, according to one or more embodiments shown and described herein.

Referring to FIG. 3A, the rotary grommet holder 140 may include a plurality of grommet chambers 142 circumferentially spaced about a rotational axis (e.g., stem 148). Each chamber may be configured to hold a plurality of grommets therein. For example, referring briefly to FIG. 9A, a grommet chamber 142 of a rotary grommet holder 140 is depicted. The grommet chamber 142 may be divided into discrete zones or grooves. For example, and as illustrated in FIG. 9A, the grommet chamber 142 may include a first grommet zone 142a, a second grommet zone 142b, and a third grommet zone 142c. However, it is contemplated that a grommet chamber 142 may include a greater or fewer number of grommet zones without departing from the scope of the present disclosure. Each grommet zone may be configured to retain a grommet therein. For example, each grommet zone may be bordered by flanges 143a, 143b which retain a single grommet 30 within the grommet zone. The grommet zones may, in some cases be spaced from one another to prevent grommets from nesting within one another. The grommet zones may be contoured such that the installer 120 may both load each zone of the grommet chamber 142 with a grommet and unload each grommet in reverse order. It is noted that while the contour of each zone is illustrated as comprising a particular shape, the shape may be varied without departing from the scope of the present disclosure. For example, flange 143a may extend farther inward than flange 143b or vice-a-versa. It is noted that in some embodiments, an insert may be fitted within the grommet chamber 142 for different sized/shaped grommets, which may allow installation of different grommet types using the save rotary grommet holder 140.

Referring back to FIG. 3A, the rotary grommet holder 140 may further include an installation opening 144 positioned among the circumferentially spaced grommet chambers 142. Accordingly, the installation opening 144 and the grommet chambers 142 may together encircle the stem 148. The installation opening 144 may provide a path for the installer 120 to pass through with a grommet (e.g., grommet 30 illustrated in FIGS. 9A-9F). Accordingly, the installation opening 144 may include a sidewall 146, as illustrated in FIG. 3A, to define an opening 145 of the installation opening 144 extending therethrough.

Figure 3B:
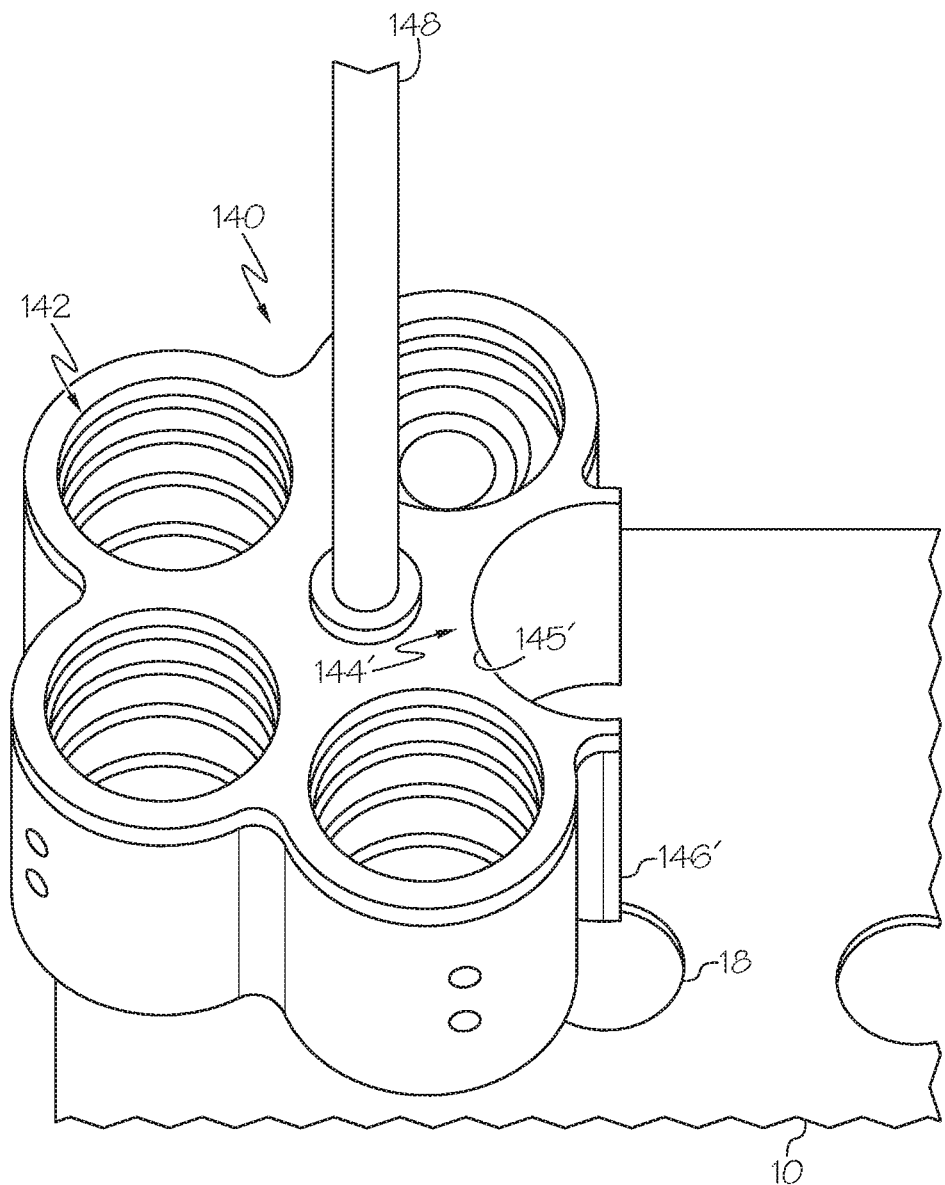
FIG. 3B depicts a rotary grommet holder, according to one or more embodiments shown and described herein.

FIG. 3B illustrates another embodiment of a rotary grommet holder 140'. In such embodiment, a sidewall 146' of an installation opening 144' does not completely surround the opening 145' thereof, as illustrated in FIG. 3A. Instead, the sidewall 146' is open to an outside of the rotary grommet holder 140'. Such an embodiment may aid in alignment issues when a grommet is coupled to an installer 120 in an off-center manner. Accordingly, more room may be provided for the grommet to be passed through the installation opening 144'.

Referring again to FIGS. 2A and 2B, as noted above, the installation unit 110 further includes the installer 120. The installer 120 may be any device capable of retrieving a grommet from the rotary grommet holder 140 and installing said grommet into a grommet aperture 18 of the vehicle panel 10 (e.g., as illustrated in FIG. 1). The installer 120 may include a tip assembly 130 configured to pick up and release a grommet. Accordingly, the tip assembly 130 may be coupled to the robotic arm 104 and movable relative thereto. For example, and as illustrated, the tip assembly 130 may be coupled to the robotic arm 104 and/or the installer connector portion 152 through a linear actuator 122 (e.g., mechanical, hydraulic, pneumatic, etc.). The linear actuator 122 may extend and retract the tip assembly 130 relative to the rotary grommet holder 140 to, for example, retrieve a grommet from a grommet chamber 142 and install the grommet into a grommet aperture 18 through the rotary grommet holder 140.

Figure 4A:
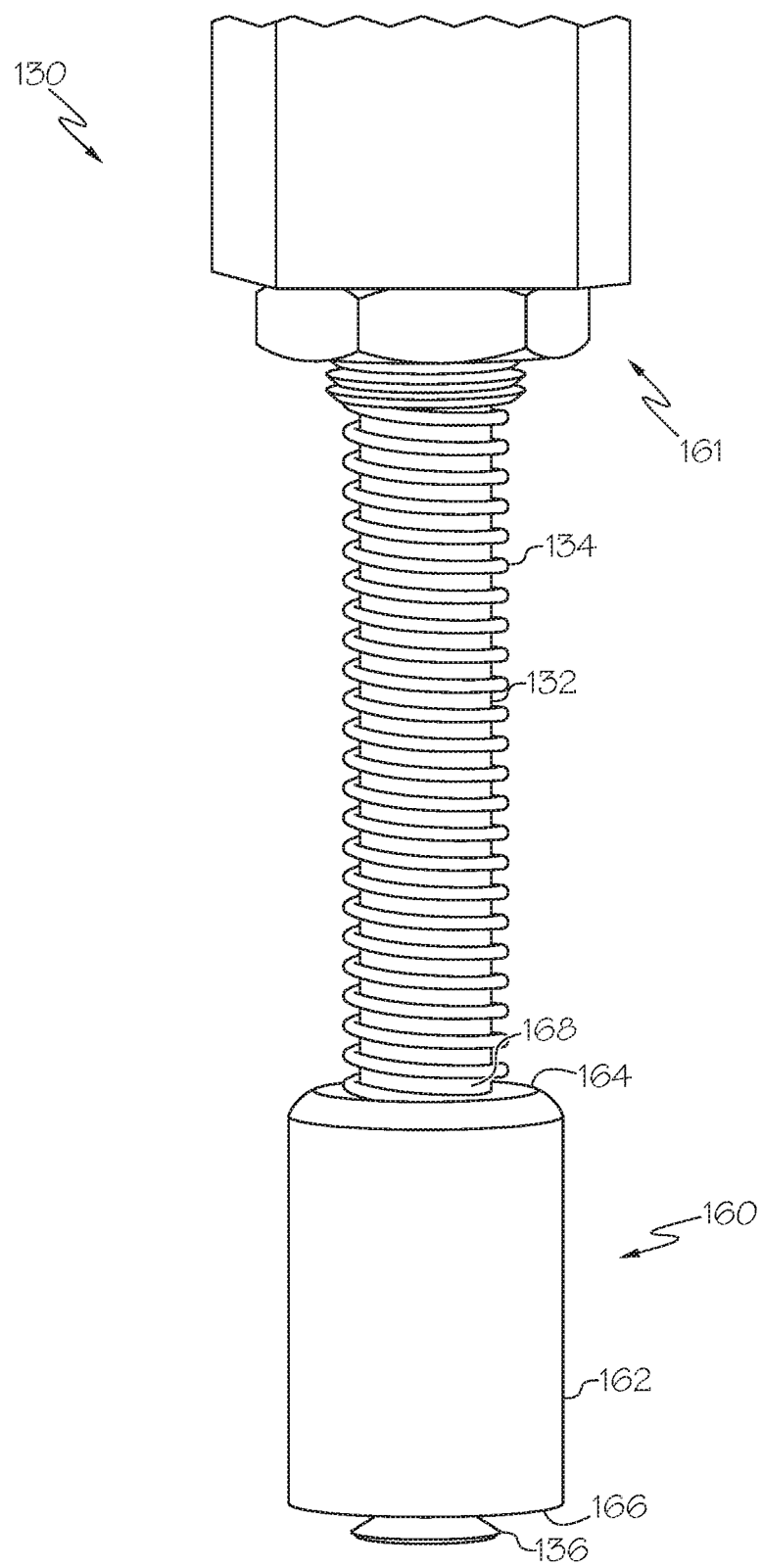
FIG. 4A depicts a tip assembly, according to one or more embodiments shown and described herein.
Figure 4B:
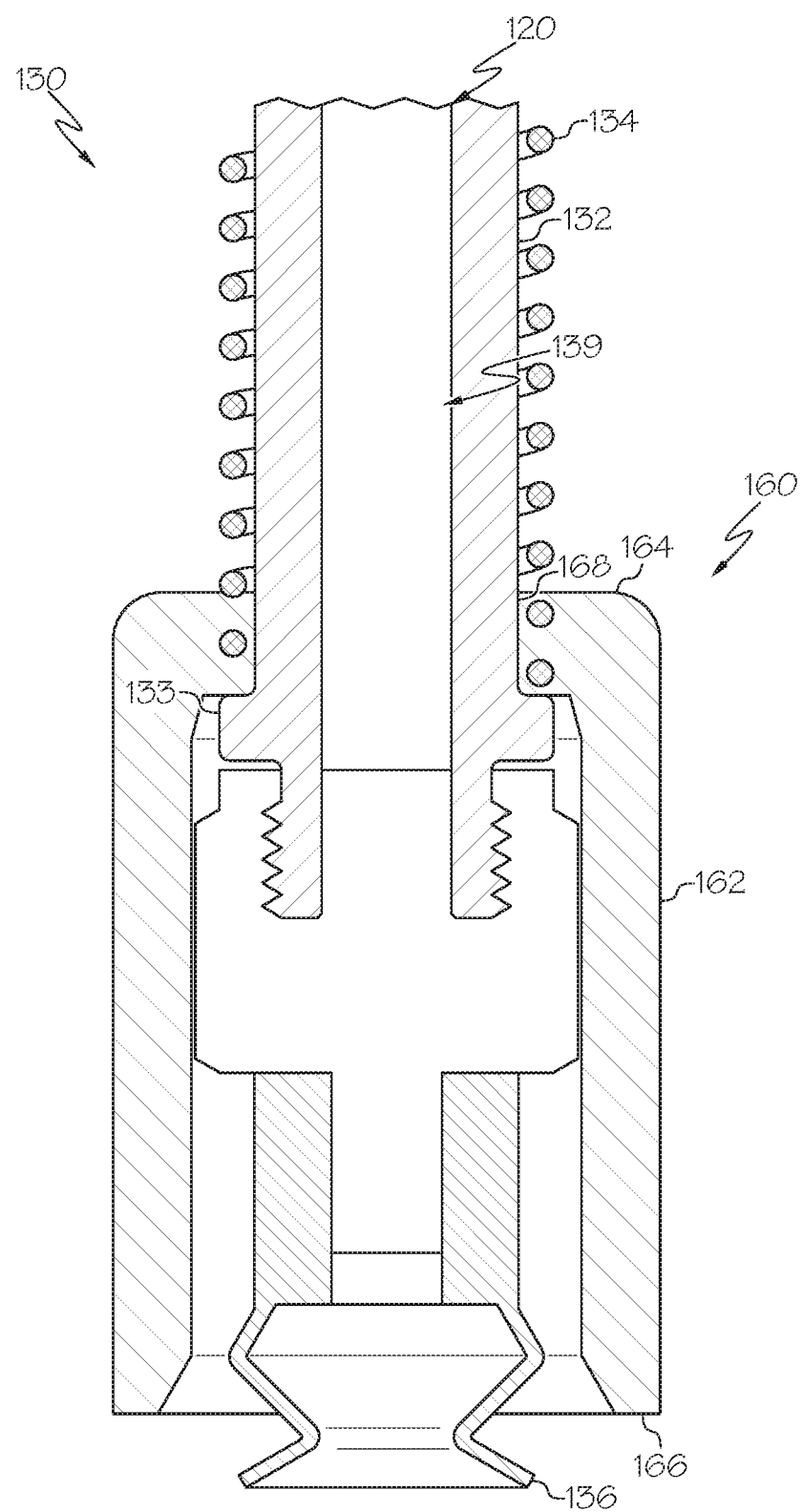
FIG. 4B illustrates a cross-section of the tip assembly of FIG. 4A, according to one or more embodiments shown and described herein.

FIG. 4A illustrates a detailed view of a tip assembly 130 according to one or more embodiments. FIG. 4B illustrates a vertical cross-section of the tip assembly 130 of FIG. 4A. Referring collectively to FIGS. 4A and 4B, the tip assembly 130 may include a suction cup 136, a stabilizer 160, and a tip assembly stem 132. It is contemplated that in some embodiments, the tip assembly stem 132 and the linkage 124 illustrated in FIG. 2A may be integral with one another. In other embodiments, they may be separate components coupled to one another. In yet further embodiments, and as will be described in reference to FIG. 5, there may be no linkage 124.

Referring collectively to FIGS. 4A and 4B, the suction cup 136 and the tip assembly stem 132 may be operatively coupled to one another such that movement of the tip assembly stem 132 moves the suction cup 136. For example, the tip assembly stem 132 may be operatively coupled to the linear actuator 122 so as to be moved in the vertical direction (e.g., +/−Z direction of the depicted coordinate axes).

In some embodiments, the tip assembly 130 may be configured to supply vacuum pressure to attach to a grommet. For example, and as shown in FIG. 4B, a hollow 139 may extend through the tip assembly 130 including the suction cup 136. A vacuum pressure source (e.g., a venturi vacuum generator located on the tip assembly 130) may be fluidly coupled to the hollow 139 of the tip assembly 130 so as to provide suction through the tip assembly 130. A vacuum pressure source such as a venturi vacuum generator may improve vacuum pressure and time responses. When the tip assembly 130 presses against a grommet the vacuum pressure may couple the tip assembly 130 to the grommet and the suction cup 136 may provide an air tight seal between the tip assembly 130 and the grommet. As will be described below, the application of vacuum pressure and the release thereof may be controlled using a control unit.

Positioned around the tip assembly stem 132 and the suction cup 136 may be a stabilizer 160. The stabilizer 160 may be any device that is configured to stabilize (e.g., prevent tilting) a grommet once attached to the tip assembly 130. Accordingly, the stabilizer 160 may keep the grommet level and/or aligned on the suction cup 136 as it is installed into a grommet aperture 18 of a vehicle panel 10. As illustrated in the present embodiment, the stabilizer 160 includes a sidewall 162 that provides a circular cross-section in the X-Y plane of the depicted coordinate axes, although other cross-sections are contemplated and possible (e.g., square, rectangular, triangular, oval, elliptical, etc.). The sidewall 162 extends between an open end 166, through which the suction cup 136 extends, and a partially closed end 164 through which the tip assembly stem 132 extends. The partially closed end 164, accordingly defines a stem opening 168 through the tip assembly stem 132 may slide. Referring to FIG. 4B, the tip assembly stem 132 may include a stop 133 configured to interface with the partially closed end 164 of the stabilizer 160 and prevent further movement of the stabilizer 160 in the −Z direction of the depicted coordinate axes. In some embodiments, the stabilizer 160 may be adjusted to accommodate difference sized and/or shaped grommets either by replacing the stabilizer 160 or, in some embodiments, the stabilizer 160 may include an adjustable aperture at the open end 166 (e.g., such as an iris) to adjust to different size and/or shaped grommets.

The tip assembly 130 may further include a spring 134 or similar biasing element to bias the stabilizer 160 to an extended position wherein the partially closed end 164 of the stabilizer 160 is in contact with the stop 133 of the tip assembly stem 132. The spring 134 may extend between the stabilizer 160 and a structural member 161 (e.g., flange, bolt, other components situated along the tip assembly stem 132, or even a housing of the linear actuator 122) of the tip assembly 130. Accordingly, as the linear actuator 122 extends or retracts the tip assembly stem 132, the spring 134 may compress and bias the stabilizer 160 into the extended position. The spring 134 may also act to limit the effects of unintended contact with the stabilizer 160 by allow the stabilizer 160 compress away from said contact.

Figure 5:
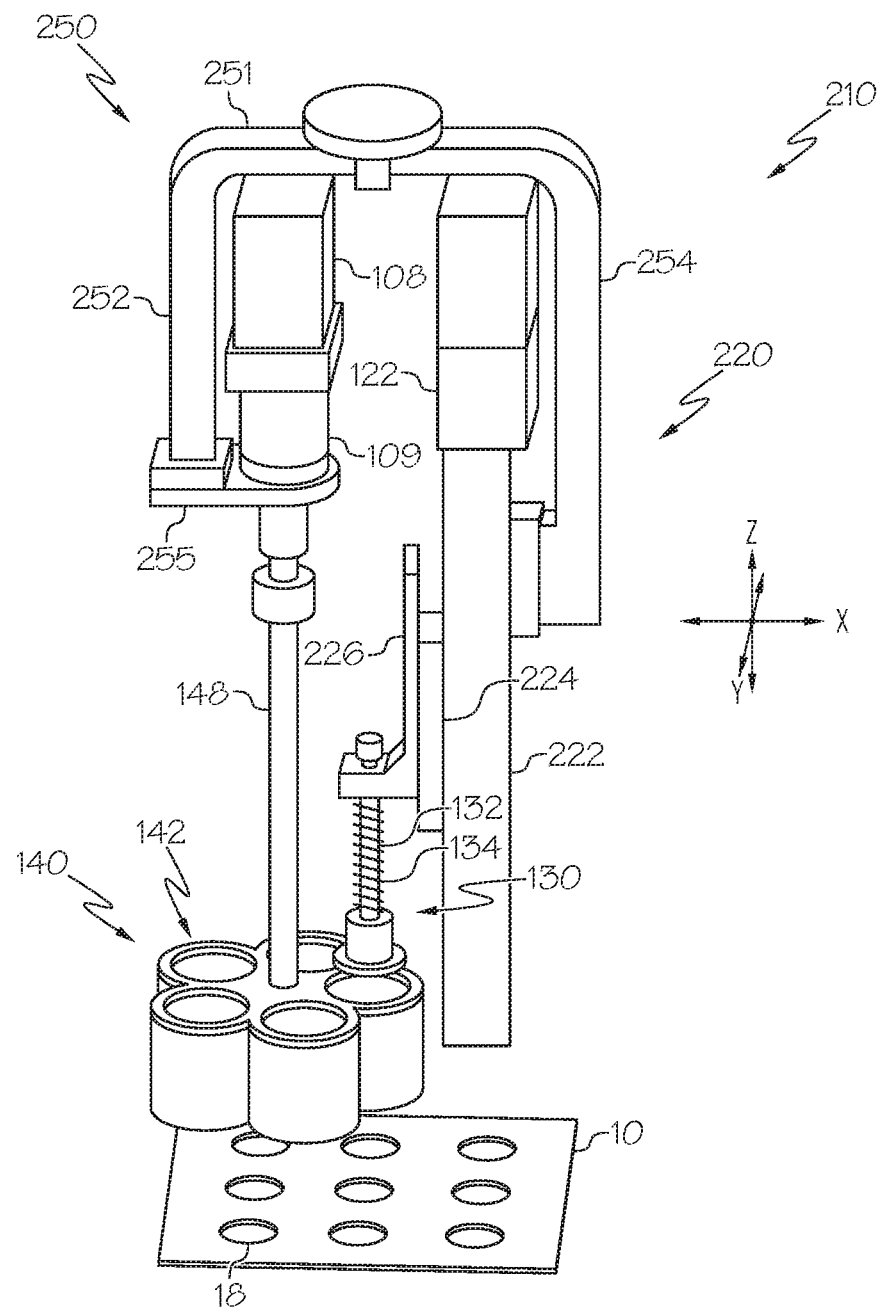
FIG. 5 depicts an installation unit, according to one or more embodiments shown and described herein.

Referring now to FIG. 5, an alternative installation unit 210 is illustrated. The installation unit 210 includes many of the features noted herein above including the tip assembly 130, and the rotary grommet holder 140. Accordingly, detailed descriptions provided above are equably applicable to the present embodiment. Moreover, variations of these components discussed above are also applicable to the present embodiment. However, in the embodiment of the installation unit 210 illustrated in FIG. 5, the installation unit 210 further includes a support fixture 250 and installer 220, which includes tip assembly 130.

The support fixture 250, similar to support fixture 150, may support motion of the rotary grommet holder 140 and the tip assembly 130. As illustrated in the present embodiment, the support fixture 250 may include a first support arm 252 and a second support arm 254 extending from a base support arm 251. Each of the first support arm 252 and the second support arm 254 may extend in the vertical direction (i.e., the Z direction of the depicted coordinate axes). The first support arm 252 may support rotation of the rotary grommet holder 140 and the second support arm 254 may support linear motion of the tip assembly 130 as described below.

To support rotation of the rotary grommet holder 140, coupled to the first support arm 252 may be a platform 255 that extends perpendicularly relative to the first support arm 252. The rotary actuator 108 as described above may be supported on the platform 255. As noted above the stem 148 of the rotary grommet holder 140 may be operatively coupled to the rotary actuator 108, through for example a gear box 109 having gearing that operatively couples the stem 148 of the rotary grommet holder 140 to the rotary actuator 108 such that the rotary actuator 108 may rotate the stem 148 and, thus, the rotary grommet holder 140. The gear box 109 may also be supported on or by the platform 255.

The second support arm 254 may support motion of the tip assembly 130 by supporting the linear actuator 122 (e.g., a linear slide 222 actuator). For example, coupled to the second support arm 254 may be a linear slide 222 defining a channel through which a carriage 224 may travel. Coupled to the carriage 224 may be the tip assembly 130 as described above. For example, the tip assembly 130 may be coupled to the carriage 224 through a bracket 226 (e.g., an L or similar bracket). For example, the tip assembly stem 132 may be coupled to the bracket 226 at an end of the tip assembly stem 132. Accordingly, the tip assembly 130 may be offset from the linear slide 222 providing a more compact configuration. The linear actuator 122 such as described above, may be operatively coupled to the carriage 224 to cause the carriage 224 to travel in the +/−Z direction of the depicted coordinate axes and accordingly move the tip assembly 130. In some embodiments, it is noted that the linear actuator 122 may have an integrated controller. It is noted that the embodiment illustrated in FIG. 5, may provide a more compact configuration, as tip assembly 130 is directly mounted to the carriage 224 and moves alongside it.

It is contemplated that in some embodiments, a single motor may provide linear motion of the tip assembly 130 and rotational motion of the rotary grommet holder 140. For example, through gearing, belts, and/or the like, a single motor may provide both motions.

Figure 6:
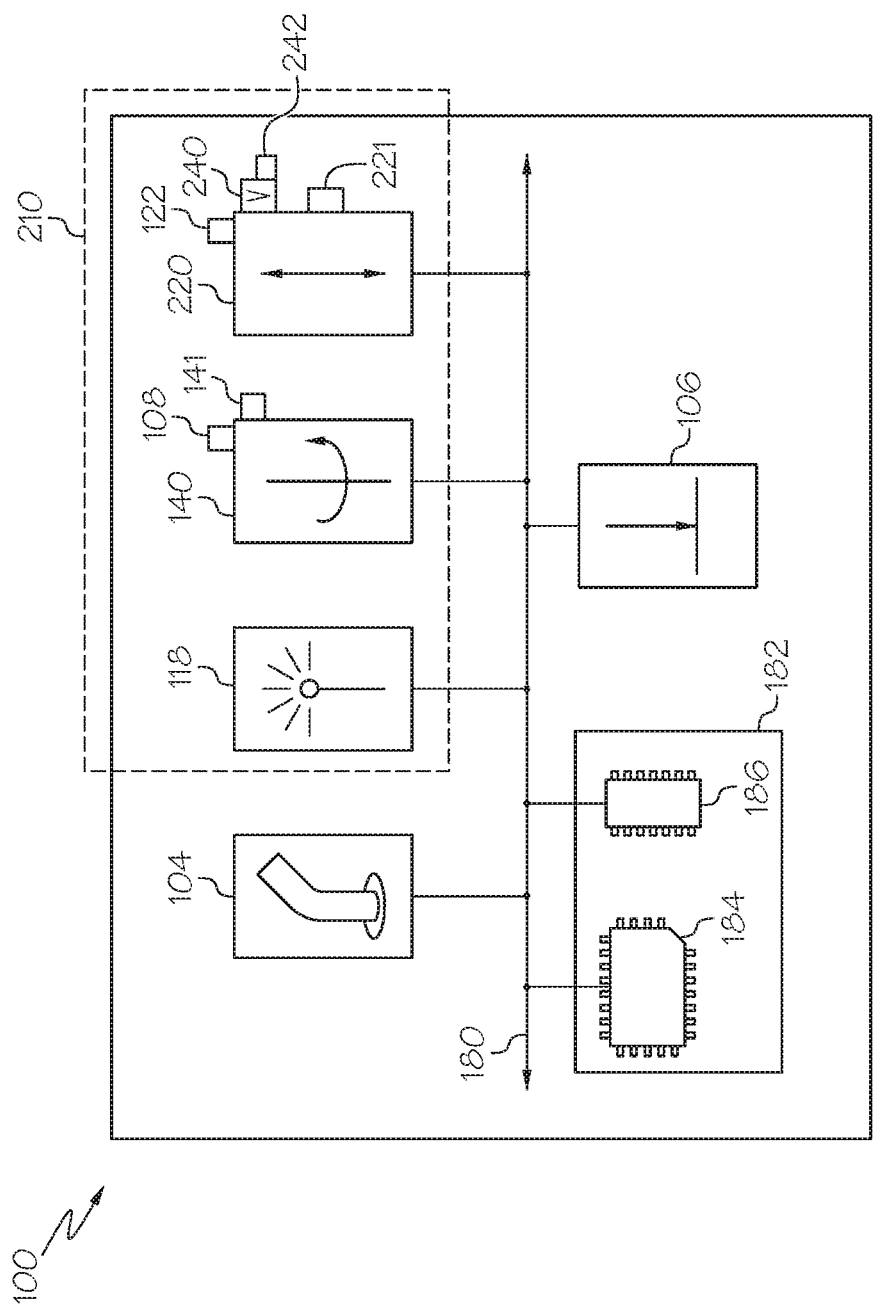
FIG. 6 illustrates a schematic diagram of components of a robotic grommet installer, according to one or more embodiments shown and described herein.

FIG. 6 illustrates a schematic diagram of components of a robotic grommet installer 100, according to one or more embodiments shown and described herein. In addition to the mechanical components noted above, the robotic grommet installer 100 further includes a communication path 180, a control unit 182 (including one or more processors 184 and one or more memories 186), the robotic arm 104, one or more grommet hole sensors 118, the rotary grommet holder 140, the rotary actuator 108, one or more rotary grommet holder sensors 141, the installer 220, the linear actuator 122, a vacuum source 240, one or more vacuum sensors 242, one or more installer sensors 221, and the force/torque sensor 106. The robotic grommet installer 100 may include fewer or greater components without departing from the scope of the present disclosure. It is also noted that while installer 220 is indicated in the FIG. 6, the following description is, unless otherwise noted, equally applicable to installer 120 described above. Similarly, though rotary grommet holder 140 is referenced, the following description is, unless otherwise noted equally applicable to rotary grommet holder 140' discussed above.

The control unit 182 may be configured to control operation of the various components of the robotic grommet installer 100. In some embodiments, the control unit 182 may include multiple integrated controllers within the various component of the robotic grommet installer 100. For example, the robotic arm 104, the rotary actuator 108 of the rotary grommet holder 140, and/or the linear actuator 122 of the installer 220 may have integrated controllers capable of communicating with one another over the communication path 180.

Still referring to FIG. 6, the communication path 180 provides data interconnectivity between various components of the robotic grommet installer 100. Specifically, each of the components can operate as a node that may send and/or receive data. In some embodiments, the communication path 180 includes a conductive material that permits the transmission of electrical data signals to processors, memories, sensors, and actuators of the robotic grommet installer 100. In another embodiment, the communication path 180 can be a bus, such as, for example, a LIN bus, a CAN bus, a VAN bus, a control bus, and the like. In further embodiments, the communication path 180 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

Accordingly, the communication path 180 may be formed from any medium that is capable of transmitting a signal such as, for example, conductive wires, conductive traces, optical waveguides, or the like. Moreover, the communication path 180 may be formed from a combination of mediums capable of transmitting signals. In some embodiments, the communication path 180 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Still referring to FIG. 6, the control unit 182 can be any computing device. For instance the control unit 182 can be any type of laptop, handheld, desktop, or other form of single computing device, or can be composed of multiple computing devices. The control unit 182 includes one or more processors 184, for controlling operations of the robotic grommet installer 100, communicatively coupled with one or more memories 186 over the communication path 180. The one or more processors 184 may include any device capable of executing machine-readable instructions stored on a non-transitory computer-readable medium. Accordingly, each of the one or more processors 184 may include a controller, an integrated circuit, a microchip, a computer, and/or any other computing device.

The one or more memories 186 may be communicatively coupled to the one or more processors 184 over the communication path 180. The one or more memories 186 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the control unit 182 and/or external to the control unit 182. The one or more memories 186 may be configured to store one or more pieces of logic as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. Logic stored on the one or more memories 186 may include, for example, logic to permit the control unit 182 to cause the robotic grommet installer 100 to remove a grommet from the rotary grommet holder 140 and load a grommet in to a grommet aperture.

As noted herein above, the robotic arm 104 may be communicatively coupled to the control unit 182 over the communication path 180. The control unit 182 may execute logic stored on the one or more memories 186 with the one or more processors 184 to control the robotic arm 104 (e.g., an actuator of the robotic arm 104) to move/bend/swivel the robotic arm 104 to a desired position, e.g., an installation position, a grommet loading position, etc.

As noted above, the control unit 182 may be communicatively coupled to the rotary grommet holder 140 and the installer 220. For example, the control unit 182 may be communicatively coupled to the rotary grommet holder 140 to control rotation of the rotary grommet holder 140. Accordingly, the control unit 182 may be communicatively coupled to the rotary actuator 108 of the rotary grommet holder 140 to rotate the rotary grommet holder 140 to a desired position. Similarly, the control unit 182 may be communicatively coupled to the linear actuator 122 of the installer 220 to control the linear motion of the installer 220 (e.g., the tip assembly 130). During operation the control unit 182 may simultaneously control movement of both the rotary grommet holder 140 and the tip assembly 130.

For example, the control unit 182 may execute logic stored on the one or more memories 186 with the one or more processors 184 to cause the robotic grommet installer 100 to rotate the rotary grommet holder 140 to an installer loading position wherein the installer 220 (including the tip assembly 130) is aligned with a grommet aperture 18. When in the installer 220 loading position, the control unit 182 may execute logic with the one or more processors 184 to cause the installer 220 (e.g., the tip assembly 130) to extend the installer 220 to attach (e.g., with the suction cup 136 of the tip assembly 130) to a grommet positioned within a grommet chamber 142 of the rotary grommet holder 140). The installer loading position may also allow the installer 220 to insert a grommet into a grommet chamber 142 when reloading the rotary grommet holder 140 with grommets. The control unit 182 may also execute logic with the one or more processors 184 to cause the robotic grommet installer 100 to rotate the rotary grommet holder 140 to an installation position. In the installation position the installer 220 may be aligned with the installation opening 144 described above, and may insert a grommet 30 through the installation opening 144 and into an awaiting grommet aperture in a vehicle panel 10 (see e.g., FIG. 9D-9F). Similarly, when reloading the rotary grommet holder 140 with grommets, the installer 220 (e.g., the tip assembly 130) may extend through the installation opening 144 to retrieve a loose grommet from, e.g., the grommet feeder bowl 50, illustrated in FIG. 1. The installer 220 may then pull retrieved grommet back through the installation opening 144 and subsequently insert the grommet into a grommet chamber 142 of the rotary grommet holder 140.

Figure 7:
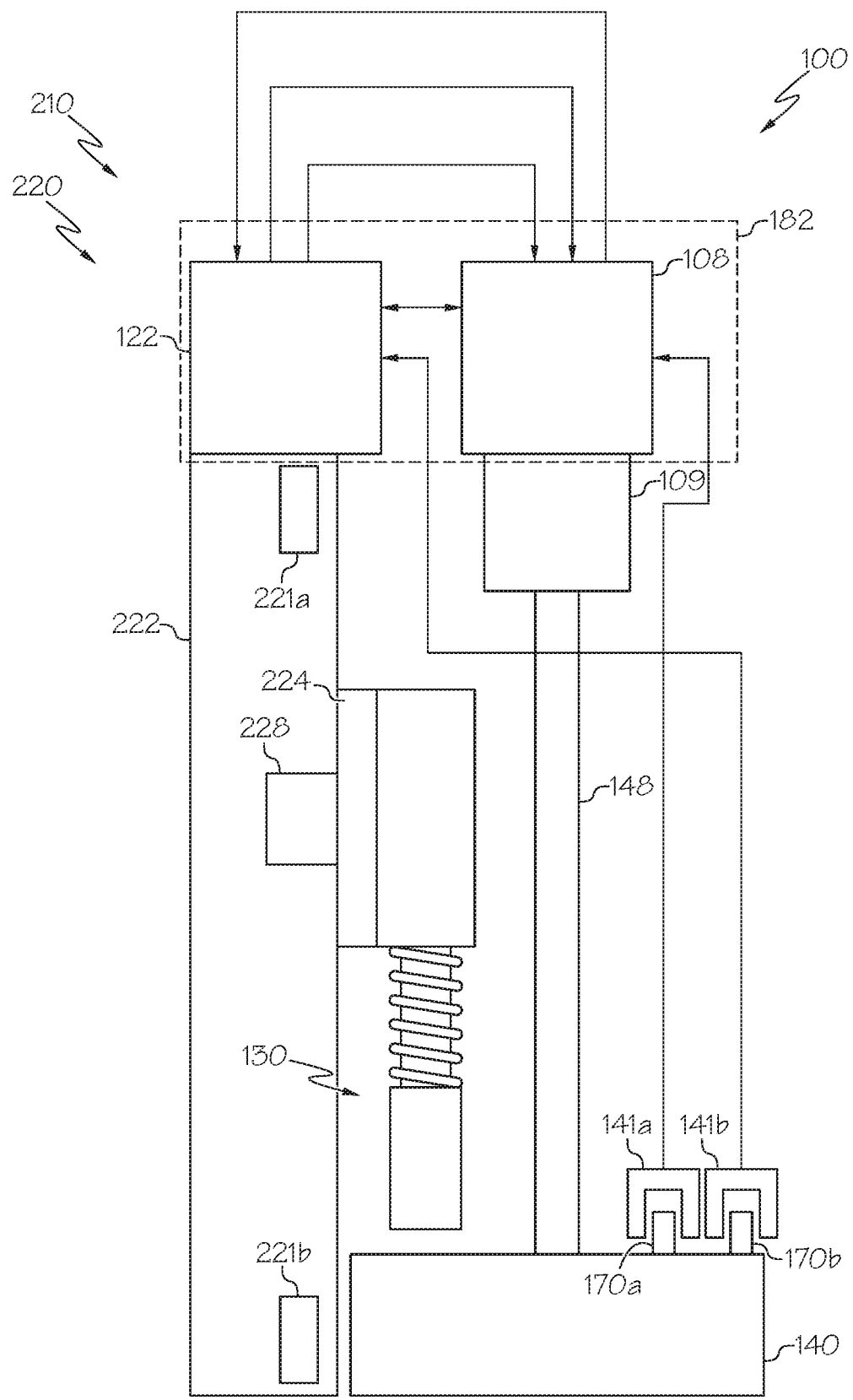
FIG. 7 depicts an installation unit, according to one or more embodiments shown and described herein.

Various sensors may be provided to enable to control unit 182 to determine proper positioning of the rotary grommet holder 140 and/or the installer 220. As noted above, the robotic grommet installer 100 may include one or more rotary grommet sensors 141. The rotary grommet sensors 141 may include any sensor configured to output a signal indicative of a position of the rotary grommet holder 140. For example, the one or more rotary grommet sensors 141 may include optical sensors, infrared sensors, cameras, magnetic sensors, or the like. FIG. 7 schematically illustrates robotic grommet installer 100 and the example communication paths between the various components (illustrated by arrows) such that control may be distributed between discrete integrated controllers within components, in a distributed computing arrangement. Accordingly, when referring to control unit 182 may refer to integrated controllers within components themselves. Accordingly, the various components may provide feedback to one another.

Still referring to FIG. 7, the one or more rotary grommet sensors 141 may include optical sensors 141a and 141b that output a beam (e.g., light). Flags 170a, 170b may be coupled to the rotary grommet holder 140 such when a flag interrupts a beam, the control unit 182 receives a signal that a position has been reached. For example, each grommet chamber 142 and installation opening 144 within the rotary grommet holder 140 may include a flag indicating that position, such that when a particular flag interrupts the beam of the optical sensor, the control unit 182 receives a signal that the rotary grommet holder 140 has reached a specified position. In the illustrated embodiment, both the linear actuator 122 and the rotary actuator 108 include integrated controllers, such that the control unit 182 is distributed between the integrated controllers of the linear actuator 122 and the rotary actuator 108. In such embodiments, it may be beneficial that a first optical sensor 141a communicate directly with an integrated controller of the rotary actuator 108 to indicate that the rotary actuator 108 has reached an installation or loading position. Similarly, a second optical sensor 141b may communicate directly with an integrated controller of the linear actuator 122 to indicate that rotary actuator 108 is in position and that the installer 220 may extend to either install a grommet through the installation opening 144 or retrieve a grommet from a grommet chamber 142. Accordingly, each installation opening 144 and/or grommet chamber 142 may include a two flags to interact with the first and second optical sensors 141a, 141b, respectively.

In such a distributed computing arrangement as schematically illustrated in FIG. 7, the integrated controller of the rotary actuator 108 may communicate directly within the integrated controller of the linear actuator 122 to communicate, for example, that the rotary grommet holder 140 is in motion and not to extend the installer 220, commands to move the rotary grommet holder 140 to a grommet loading position and/or an installation position, and the like.

Referring again to FIG. 6 and as noted above, the robotic grommet installer 100 may include one or more installer sensors 221. The installer sensors 221 may include any sensor configured to output a signal indicative of a position of the installer 220 (e.g., the tip assembly 130). For example, the one or more installer sensors 221 may include optical sensors, infrared sensors, cameras, magnetic sensors, or the like. For example, referring again to FIG. 7, coupled to the linear slide 222 may be a first limit sensor 221a positioned at a first end of the linear slide 222 and a second limit sensor 221b positioned at a second end of the linear slide 222. In such embodiments, the first and second limit sensors 221a, 221b may be optical sensors that output a beam (e.g., light). The carriage 224 may have a flag 228 coupled thereto that when the installer 220 is fully extended and or retracted may break the beam of the limit sensor 221a, 221b which may indicate to the controller the position of the installer 220. Moreover, the control unit 182 may execute logic to estimate a position of the carriage 224 in between the limit sensors 221a, 221b and the operation speed of the linear actuator 122.

Referring again to FIG. 6, as noted herein, the tip assembly 130 of the installer 220 may be configured to supply vacuum pressure therethrough. Accordingly, the installer 220 may include a vacuum source 240 that is communicatively coupled to the control unit 182, such that the control unit 182 may selectively enable and disable the vacuum pressure. For example, the control unit 182 may enable vacuum pressure when handling a grommet and disable the vacuum pressure when releasing a grommet. In some embodiments, a vacuum sensor 242 may output a signal indicative of whether a grommet has been pickup up and or released. For example, when the vacuum pressure is active but air flow through the tip assembly 130 has ceased, it may be determined that a grommet has been attached to the tip assembly 130. Similarly, when vacuum pressure has ceased, it may be determined that the grommet has been released. However, it is also contemplated that other sensors may be used to determine a grommet has been picked up and released. E.g., optical sensors, infrared sensors, cameras, etc.

It is noted, that in installing grommet within a vehicle panel 10, the control unit 182 may be configured with logic, stored on the one or more memories 186, wherein positions at which to install grommets within a vehicle panel 10 are pre-programed such that the robotic arm 104 is automatically moved to the correct positions for installation. In other embodiments, a grommet hole sensor 118 may be communicatively coupled to the control unit 182 over the communication path 180. The grommet hole sensor 118 may include any sensor configured to output a signal indicative of the location of a grommet aperture 18. For example, grommet hole sensors may include but are not limited to cameras (e.g., 3-D cameras), proximity sensors, light sensors, and the like. Base on a signal from the grommet hole sensor 118, the control unit 182 may guide the installation unit 210 with the robotic arm 104 to locate a grommet aperture and refine a position of the installation unit 110 for insertion of a grommet. It is noted that in some embodiments the grommet hole sensor 118 or a different dedicated sensor may be used to inspect the grommet 30 after installation within the grommet aperture 18.

Figure 8:
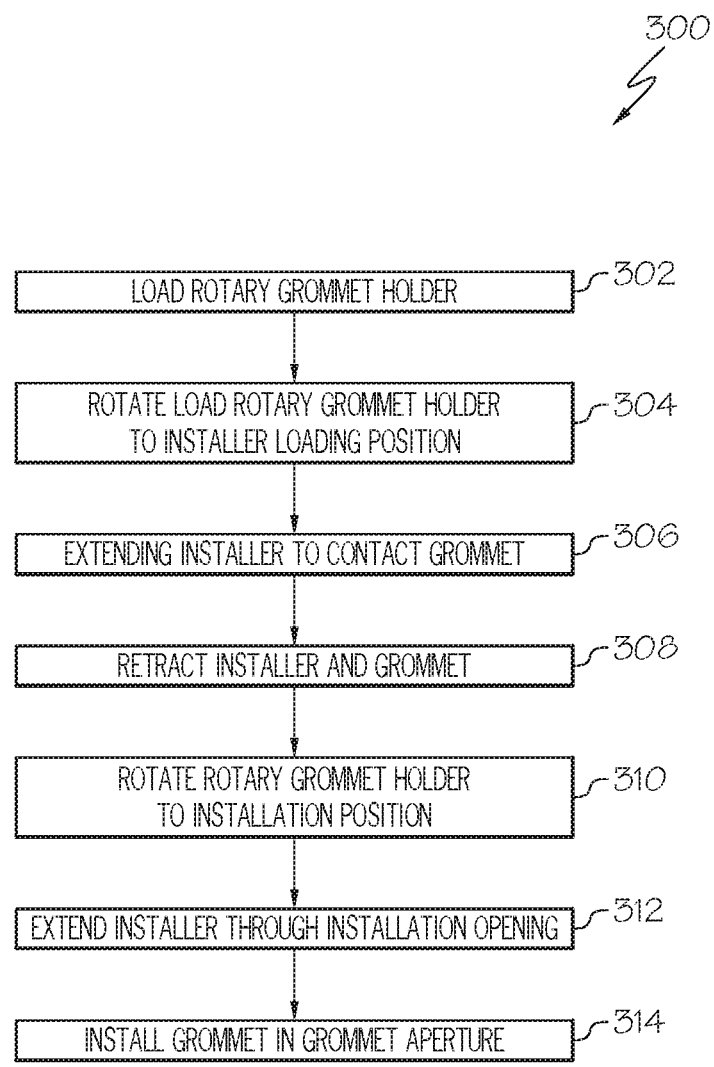
FIG. 8 illustrates a method for installing a grommet with a robotic grommet installer, according to one or more embodiments shown and described herein.

Referring now to FIG. 8, a flow diagram depicting a method 300 of installing a grommet into a grommet aperture 18 is depicted. It is noted that though a certain number and order of steps are illustrated, a fewer or greater number of steps in a varying order is contemplated and possible without departing from the scope of the present disclosure. The steps of method 300 may be better understood in conjunction with FIGS. 9A-9F.

Step 302 includes loading the rotary grommet holder 140 with a plurality of grommets. As noted herein above, the robotic grommet installer 100 may use the installer 220 as described herein to retrieve loose grommets from a grommet feeder bowl 50 and position them within the various grommet chambers 142. For example, the tip assembly 130 may be extended through the installation opening 144 of the rotary grommet holder 140 (e.g., with the linear actuator 122) and aligned with a grommet 30 in a feeder bowl. The suction cup 136 of the tip assembly 130 may be pressed against the grommet 30 to create a seal and vacuum pressure may be supplied through the tip assembly 130 to securely hold the grommet 30 to the tip assembly 130. The tip assembly 130 may then be retracted through the installation opening 144 of the rotary grommet holder 140 (e.g., with the linear actuator 122). Once the tip assembly 130 and grommet 30 are positioned outside of the rotary grommet holder 140, the rotary grommet holder 140 may be rotated (e.g., with the rotary actuator 108) to a grommet chamber 142, wherein the tip assembly 130 may load each zone of each grommet chamber 142 with a grommet 30. FIG. 9A illustrates a rotary grommet holder 140 having a grommet 30 positioned within each of the zones 142*a,* 142*b,* and 142*c.* It is noted that the installer 220 (e.g., the tip assembly 130) may be aligned with a grommet aperture 18 of a vehicle panel 10 at any time during performance of the method 300 prior to installation of the grommet 30 within the grommet aperture 18.

Referring again to FIG. 8, at step 304, the rotary grommet holder 140 is rotated to an installer loading position. In the installer loading position, the installer 220 is aligned with a grommet chamber 142 of the rotary grommet holder 140. Referring again to FIG. 9A, the tip assembly 130 is illustrated as being aligned with the grommet chamber 142 of the rotary grommet holder 140. Step 306 includes extending the installer 220 to contact the grommet 30. Referring to FIG. 9B, the tip assembly 130 is illustrated extending to contact the grommet 30 within grommet zone 142*a.* At step 306, grommet 30 may be attached to the installer 220 using e.g., the suction cup 136 of the tip assembly 130 and vacuum pressure (e.g. as applied by the vacuum source 240). As noted above, the control unit 182 may selectively enable and cease the application of vacuum pressure to pick up and release the grommet 30. At step 308 the installer 220 and grommet 30 are retracted to pull the grommet 30 from the rotary grommet holder 140. FIG. 9C illustrates the grommet 30 having been removed from the rotary grommet holder 140 by the tip assembly 130 of the installer 220.

At step 310, the rotary grommet holder 140 is rotated to an installation position. In such position, the installer 220 is aligned within the installer 220 opening 145 as illustrated in FIG. 9D. At step 312, the installer 220 is extended through the installation opening 144 as illustrated in FIG. 9D. At step 314 the installer 220 installs the grommet 30 into the grommet aperture 18. As shown in FIG. 9E the grommet 30 is pressed into the waiting aperture. Upon completion of installation, the vacuum pressure may be ceased, to release the grommet 30 from the installer 220.

The robotic grommet installer 100 may repeat the process outlined in method 300 until all of the grommets are dispensed into grommet apertures or until all the grommet apertures are filled. In some embodiments, when the rotary grommet installer 140 no longer has grommets to dispense, the robotic grommet installer 100 may automatically reload the rotary grommet holder 140 with the installer 220 or replace the rotary grommet holder 140 with a filled rotary grommet holder and automatically continue installing grommets.

Embodiments can be described with reference to the following numbered clauses:

1. A robotic grommet installer, comprising: a robotic arm, and an installation unit comprising: a rotary grommet holder rotatively coupled to the robotic arm, the rotary grommet holder comprising a plurality of grommet chambers spaced circumferentially about a rotational axis of the rotary grommet holder, wherein each grommet chamber of the plurality of grommet chambers is configured to hold a plurality of grommets, and an installer coupled to the robotic arm and configured to retrieve a grommet from the rotary grommet holder, wherein the rotary grommet holder is configured to rotate to align the installer with an available grommet positioned within one of the plurality of grommet chambers.

2. The robotic grommet installer of clause 1, wherein the rotary grommet holder further comprises an installation opening wherein the installer passes through the installation opening of the rotary grommet holder to install the grommet into a grommet aperture.

3. The robotic grommet installer of clause 1, wherein each of the grommet chambers of the plurality of grommet chambers comprise zones configured to prevent the plurality of grommets positioned within the grommet chamber from nesting within one another.

4. The robotic grommet installer of clause 1, wherein the rotary grommet holder is removably coupled to the robotic arm.

5. The robotic grommet installer of clause 1, wherein the installer comprises a tip assembly configured to supply vacuum pressure to attach to the grommet.

6. The robotic grommet installer of clause 5, wherein the tip assembly comprises a suction cup configured to provide a seal between the tip assembly and the grommet.

7. The robotic grommet installer of clause 1, wherein the installer comprises: a tip assembly configured to pick up and release the grommet; and an actuator coupled to the tip assembly configured to raise and lower the tip assembly relative to the rotary grommet holder.

8. A robotic grommet installer, comprising: a control unit for controlling installation of a grommet using the robotic grommet installer; a robotic arm communicatively coupled to the control unit, and an installation unit comprising: a rotary grommet holder communicatively coupled to the control unit and rotatively coupled to the robotic arm, the rotary grommet holder comprising a plurality of grommet chambers spaced circumferentially about a rotational axis of the rotary grommet holder, wherein each grommet chamber of the plurality of grommet chambers is configured to hold a plurality of grommets, and an installer communicatively coupled to the control unit, coupled to the robotic arm, and configured to retrieve the grommet from the rotary grommet holder, wherein the rotary grommet holder is configured to rotate to align the installer with an available grommet positioned within one of the plurality of grommet chambers; wherein the control unit executes logic to cause the robotic grommet installer to: rotate the rotary grommet holder to an installer loading position; attach the available grommet positioned within the grommet chamber to the installer; rotate the rotary grommet holder to an installation position; and install the grommet with the installer into a grommet aperture.

9. The robotic grommet installer of clause 8, wherein the rotary grommet holder further comprises an installation opening wherein the installer passes through the installation opening of the rotary grommet holder to install the grommet into the grommet aperture.

10. The robotic grommet installer of clause 8, wherein each of the grommet chambers of the plurality of grommet chambers comprises grooves configured to prevent the plurality of grommets positioned within the grommet chamber from nesting within one another.

11. The robotic grommet installer of clause 8, wherein the rotary grommet holder is removably coupled to the robotic arm.

12. The robotic grommet installer of clause 8, wherein the installer comprises a tip assembly configured to supply vacuum pressure to attach to the grommet and the control unit controls the vacuum pressure to attach to and release the grommet.

13. The robotic grommet installer of clause 12, wherein the tip assembly comprises a suction cup configured to provide a seal between the tip assembly and the grommet.

14. The robotic grommet installer of clause 12, further comprising a vacuum sensor configured to output a signal indicative of the vacuum pressure being supplied by the tip assembly, wherein the control unit determines whether the grommet is attached to the tip assembly based on the signal of the vacuum sensor.

15. The robotic grommet installer of clause 8, wherein the installer comprises: a tip assembly configured to pick up and release the grommet; and an actuator coupled to the tip assembly, wherein the control unit causes the actuator to raise and lower the tip assembly relative to the rotary grommet holder.

16. A method of installing a grommet into a grommet aperture, comprising: loading a rotary grommet holder with a plurality of grommets, wherein: the rotary grommet holder is rotatively coupled to a robotic arm; the rotary grommet holder comprises a plurality of grommet chambers spaced circumferentially about a rotational axis of the rotary grommet holder; and the plurality of grommets are loaded into at least one of the plurality of grommet chambers; rotating the rotary grommet holder to an installer loading position; attaching the grommet positioned within a grommet chamber of the rotary grommet holder to an installer, wherein the installer is coupled to the robotic arm; rotating the rotary grommet holder to an installation position; and installing the grommet with the installer into the grommet aperture.

17. The method of clause 16, further comprising: extending the installer to contact the grommet within the grommet chamber; retracting the installer relative to the rotary grommet holder; and extending the installer with the grommet attached thereto once the rotary grommet holder is positioned at the installation position through an installation opening of the rotary grommet holder.

18. The method of clause 16, wherein the installer is configured to load the rotary grommet holder with the plurality of grommets.

19. The method of clause 16, wherein the grommet is attached to the installer by a vacuum pressure.

20. The method of clause 16, wherein the rotary grommet holder is removably coupled to the robotic arm.

It should now be understood that embodiments of the present disclosure are directed to robotic grommet installers and methods of installing grommets. Robotic grommet installers of the present disclosure include a robotic arm that is used to insert grommets in locations with tight geometric constraints. Included with the robotic arm are a rotary grommet holder and an installer. The rotary grommet holder has a plurality of grommet chambers spaced circumferentially about a rotational axis. The plurality of grommet chambers each are configured to hold a plurality of grommets. The installer is configured to retrieve a grommet from the rotary grommet holder and then install the grommet into a grommet aperture in, for example, a vehicle panel. In embodiments, the robotic grommet installer is able to insert grommets in locations with tight geometric constraints as only an installer is extended to insert the grommet. Accordingly, the process of installing grommets may be automated, which may improve installation speeds and reduce costs.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A robotic grommet installer, comprising:
   a robotic arm, and
   an installation unit comprising:
      a rotary grommet holder rotatively coupled to the robotic arm, the rotary grommet holder comprising a plurality of grommet chambers spaced circumferentially about a rotational axis of the rotary grommet holder, wherein each grommet chamber of the plurality of grommet chambers is configured to hold a plurality of grommets, and
      an installer coupled to the robotic arm and configured to retrieve a grommet from the rotary grommet holder, wherein the rotary grommet holder is configured to rotate to align the installer with an available grommet positioned within one of the plurality of grommet chambers.

2. The robotic grommet installer of claim 1, wherein the rotary grommet holder further comprises an installation opening wherein the installer passes through the installation opening of the rotary grommet holder to install the grommet into a grommet aperture.

3. The robotic grommet installer of claim 1, wherein each of the grommet chambers of the plurality of grommet chambers comprise zones configured to prevent the plurality of grommets positioned within the grommet chamber from nesting within one another.

4. The robotic grommet installer of claim 1, wherein the rotary grommet holder is removably coupled to the robotic arm.

5. The robotic grommet installer of claim 1, wherein the installer comprises a tip assembly configured to supply vacuum pressure to attach to the grommet.

6. The robotic grommet installer of claim 5, wherein the tip assembly comprises a suction cup configured to provide a seal between the tip assembly and the grommet.

7. The robotic grommet installer of claim 1, wherein the installer comprises:
   a tip assembly configured to pick up and release the grommet; and
   an actuator coupled to the tip assembly configured to raise and lower the tip assembly relative to the rotary grommet holder.

8. A robotic grommet installer, comprising:
   a control unit for controlling installation of a grommet using the robotic grommet installer;
   a robotic arm communicatively coupled to the control unit, and
   an installation unit comprising:
      a rotary grommet holder communicatively coupled to the control unit and rotatively coupled to the robotic arm, the rotary grommet holder comprising a plurality of grommet chambers spaced circumferentially about a rotational axis of the rotary grommet holder, wherein each grommet chamber of the plurality of grommet chambers is configured to hold a plurality of grommets, and
      an installer communicatively coupled to the control unit, coupled to the robotic arm, and configured to retrieve the grommet from the rotary grommet holder, wherein the rotary grommet holder is configured to rotate to align the installer with an available grommet positioned within one of the plurality of grommet chambers;

wherein the control unit executes logic to cause the robotic grommet installer to:
rotate the rotary grommet holder to an installer loading position;
attach the available grommet positioned within the grommet chamber to the installer;
rotate the rotary grommet holder to an installation position; and
install the grommet with the installer into a grommet aperture.

9. The robotic grommet installer of claim 8, wherein the rotary grommet holder further comprises an installation opening wherein the installer passes through the installation opening of the rotary grommet holder to install the grommet into the grommet aperture.

10. The robotic grommet installer of claim 8, wherein each of the grommet chambers of the plurality of grommet chambers comprises grooves configured to prevent the plurality of grommets positioned within the grommet chamber from nesting within one another.

11. The robotic grommet installer of claim 8, wherein the rotary grommet holder is removably coupled to the robotic arm.

12. The robotic grommet installer of claim 8, wherein the installer comprises a tip assembly configured to supply vacuum pressure to attach to the grommet and the control unit controls the vacuum pressure to attach to and release the grommet.

13. The robotic grommet installer of claim 12, wherein the tip assembly comprises a suction cup configured to provide a seal between the tip assembly and the grommet.

14. The robotic grommet installer of claim 12, further comprising a vacuum sensor configured to output a signal indicatively of the vacuum pressure being supplied by the tip assembly, wherein the control unit determines whether the grommet is attached to the tip assembly based on the signal of the vacuum sensor.

15. The robotic grommet installer of claim 8, wherein the installer comprises:
a tip assembly configured to pick up and release the grommet; and
an actuator coupled to the tip assembly, wherein the control unit causes the actuator to raise and lower the tip assembly relative to the rotary grommet holder.

16. A method of installing a grommet into a grommet aperture, comprising:
loading a rotary grommet holder with a plurality of grommets, wherein:
the rotary grommet holder is rotatively coupled to a robotic arm;
the rotary grommet holder comprises a plurality of grommet chambers spaced circumferentially about a rotational axis of the rotary grommet holder; and
the plurality of grommets are loaded into at least one of the plurality of grommet chambers;
rotating the rotary grommet holder to an installer loading position;
attaching the grommet positioned within a grommet chamber of the rotary grommet holder to an installer, wherein the installer is coupled to the robotic arm;
rotating the rotary grommet holder to an installation position; and
installing the grommet with the installer into the grommet aperture.

17. The method of claim 16, further comprising:
extending the installer to contact the grommet within the grommet chamber;
retracting the installer relative to the rotary grommet holder; and
extending the installer with the grommet attached thereto once the rotary grommet holder is positioned at the installation position through an installation opening of the rotary grommet holder.

18. The method of claim 16, wherein the installer is configured to load the rotary grommet holder with the plurality of grommets.

19. The method of claim 16, wherein the grommet is attached to the installer by a vacuum pressure.

20. The method of claim 16, wherein the rotary grommet holder is removably coupled to the robotic arm.

* * * * *